United States Patent Office 3,476,188
Patented Nov. 4, 1969

3,476,188
AQUEOUS FLUID DRIVE PROCESS USING MINUTE SOLIDS IN SUSPENSION
Robert R. Harvey, Bartlesville, Okla., assignor to Phillips Petroleum Company, a corporation of Delaware
No Drawing. Continuation-in-part of application Ser. No. 675,017, Oct. 13, 1967. This application Jan. 3, 1969, Ser. No. 788,909
Int. Cl. E21b 43/20
U.S. Cl. 166—274
7 Claims

ABSTRACT OF THE DISCLOSURE

Oil is recovered from a stratum by injecting an aqueous slug of minute solids in suspension, a nonionic oil-displacing surfactant in solution and a water soluble lignosulfonate dispersant, which stabilizes the suspension to displace oil from the stratum. An aqueous drive medium, e.g., water or brine, may be injected into the stratum to displace the aqueous slug having solids in suspension through the stratum and drive crude oil to a producing well.

---

This application is a continuation-in-part of my copending application Ser. No. 675,017, filed Oct. 13, 1967.

This invention relates to a method of recovering oil. In one aspect the invention relates to an improved aqueous fluid drive process. In another aspect the invention relates to controlling the stability of an aqueous suspension of solids and surfactant which is utilized to displace oil.

The use of oil-displacing surfactants to increase the efficiency of a water flooding secondary recovery method is well known. It is also known that certain minute solids, which are capable of being driven through a stratum, function as carriers to transport oil-displacing surfactant deeper into the stratum. Representative of these surfactant carriers are particles of carbon black, kaolin and talc in the size range of 0.001 to 1 micron.

Fresh water suspensions of oil-displacing surfactants and surfactant carriers are generally stable, but some suspensions are unstable in the presence of brine. This instability sometimes results in the undesirable premature precipitation of surfactant carriers. Nonionic dispersing surfactants are added to obtain a stable salt water suspension. One particularly effective class of dispersing surfactants is represented by the formula: R—O—R'—H wherein R is an aliphatic alkyl of 5 to 20 carbon atoms or an alkylaryl, the alkyl having 8 to 20 carbon atoms, and R' is a polyethylene oxide of an average of 30 to 100 units or mols. The minimum number of units of ethylene oxide in the hydrophilic chain is 30, surfactants with a lesser chain having little or no effect when incorporated in the suspension of solids in an oil-displacing surfactant solution. Typical of this class of surfactants are Igepal CO–990 and Igepal DM–970, trade names of Antara Chemical Company. Igepal CO–990 is nonylphenoxy polyethanol having an average chain length on the hydrophilic end in the range of 95–100 mols or units of ethylene oxide.

Preferred for use with this long chain dispersing surfactant are nonionic oil-displacing surfactants having the formula R—R'—R"—H wherein R is an aliphatic alkyl of 9 to 20 carbon atoms having 0 to 4 methyl branches or an alkylaryl in which the alkyl has from 8 to 20, preferably 8 to 12, carbon atoms and the aryl is attached to the R', R' is O (oxygen) or S (sulfur) and R" is a polyethylene oxide having an average of 4 to 11 ethylene oxide units or mols, preferably an average of 4 to 6.5 units. They belong to the families of polyoxyethylene or polyphenoxyethylene ethers and thioethers. The polyethylene species are exemplified by tall oil ethylene oxide, lauryl alcohol ethylene oxide, polyoxyethylene thioether, and polyoxyethylene lauryl ether, having an average chain length on the hydrophilic end in the required range of 4 to 11, preferably 4.5 to 6.5. Typical of the polyphenoxyethylene species is Igepal CO–530 supplied by Antara Chemical Company and further identified as nonylphenoxy polyethanol having an average chain length on the hydrophilic end of about 6 to 6.5 mols or units of ethylene oxide. The oil-displacing surfactants have the capacity to change the condition of the oil sand from oil-wet to water-wet. These two classes of surfactants in combination with a surfactant carrier provide a very stable suspension which when driven through a stratum displaces oil without detrimental plugging.

It is believed that there is a chem-adsorptive type of surface bonding between the components in this aqueous suspension and that the preferential adsorption of the dispersing surfactant by the stratum results in a progressive decrease in suspension stability as the suspension is driven through the stratum. As the suspension becomes unstable, the carrier and its associated oil-displacing surfactant are precipitated so as to intimately contact the stratum. The oil-displacing surfactant has the capacity to change the condition of a stratum from oil-wet to water-wet. Upon this change in condition, oil, which was not displaced by the previous passage of fluids, becomes mobile and is carried through the stratum.

In the above-described method of recovering oil, it is desirable that the aqueous slug contain a sufficient amount of dispersing surfactant to provide a degree of stability which will permit the slug to be driven from an injection well to a production well. This insures that all of the stratum between the two wells is subjected to the action of the slug.

Coupled with this desired stability is the undesired "bypassing" of the portion of the stratum nearest the injection well. So much dispersing surfactant is present that an adsorption equilibrium between the slug and stratum is reached before the suspension becomes unstable enough to precipitate the carrier and oil-displacing surfactant. Since equilibrium has been reached there is no adsorption of dispersing surfactant from portions of the slug passing through the stratum following the front portion of the slug. The oil in this region is not recovered by the process because there is no intimate contact with the oil-displacing surfactant. In some cases as much as ½ the stratum between the two wells is bypassed before the suspension becomes unstable to the degree that precipitation of the carrier and oil-displacing surfactant occurs. Yet, if the initial stability of the slug is lowered, the suspension has completely precipitated long before it reaches the production wells.

Accordingly, it is an object of the invention to provide an improved fluid drive method of displacing oil from a stratum.

Another object of the invention is to reduce the cost and increase the yield of an aqueous fluid drive process.

Another object of the invention is to control the staoil-displacing surfactant to provide for the uniform contact of a stratum with the oil-displacing surfactant.

These and other objects of the invention will be apparent to one skilled in the art upon consideration of the following disclosure and appended claims.

According to the invention, oil is recovered from a tact of a stratum with the oil-displacing surfactant. subsurface stratum by injecting through a well penetrating the stratum an aqueous slug comprising a suspension of minute solids capable of being driven through the stratum, a nonionic oil-displacing surfactant and a water-soluble lignosulfonate dispersing agent; thereafter injecting an aqueous driving medium through the well to drive the slug through the stratum so as to displace oil and recovering the displaced oil from a well penetrating the stratum.

Further in accordance with the invention, the above-described slug additionally includes a long chain dispersing surfactant to form a two-component dispersing system for the suspension.

The minute solids utilized in the practice of the invention can be any minute solid capable of being driven through a stratum and capable of functioning as a carrier to transport an oil-displacing surfactant deeper into the stratum. Representative of such minute solids, and constituting a presently preferred class, are particles of carbon black, kaolin, and talc. Other minute solids which can be utilized in the practice of the invention include dead microorganisms including bacteria and yeast cells. Still other minute solids which can be utilized in the practice of the invention include particles of solid polymers of 1-olefins containing from 2 to 6 carbon atoms per molecule, preferably polyethylene and polypropylene.

The water-soluble lignosulfonates utilized in the practice of the invention are often derived as a by-product in the manufacture of sulfite pulp where wood is cooked with calcium disulfite-magnesium disulfite-sulfur dioxide liquor. In this process the lignin is converted to a lignosulfonic acid. It is thereafter converted to a solid product such as calcium lignosulfonate, amonium lignosulfate, potassium lignosulfonate, sodium lignosulfonate, or ferrochrome lignosulfonate.

It is believed that the action of these lignosulfonate dispersants is largely electro kinetic in nature and as they are adsorbed by the particles of solids in the suspension, the lignosulfonates impart negative charges to the particles causing them to repel one another. The repelling forces prevent the formation of agglomerations of particles which would then settle from suspension. While this theory explains the action of lignosulfonates in the suspension, it is to be understood that the invention is not to be limited to such a theory.

In one embodiment of the invention, the lignosulfonates alone are used to stabilize a suspension of surfactant carrier and oil-displacing surfactant in a fresh water slug. As the fresh water slug is driven through the stratum it is diluted with connate water and other fluids, reducing the lignosulfonate concentration to the degree that it is no longer sufficient to maintain suspension stability. As the leading edge of the slug is diluted with stratum fluids there is a gradual and uniform deposition of the surfactant carrier and oil-displacing surfactant because of this reduced stability. At the trailing end of the slug, dilution by mixing with the driving fluid results in the precipitation of a second portion of the surfactant carrier and oil-displacing surfactant. By utilizing the lignosulfonate dispersants and the dilution mechanism of precipitation to contact the stratum, bypassing of portions of the stratum is avoided. In this embodiment, the surfactant carrier, preferably selected from the group consisting of carbon black, kaolin and talc, is added to the fresh water slug in an amount in the range of 0.05 to 2 weight percent of the aqueous slug. While the particle size of the surfactant carrier may be as high as 2 microns, it is preferred to use particles which do not exceed 1 micron, more preferably 0.1 micron, in size. Thus, an overall preferred range of particle size is 0.001 to 1 micron. The oil-displacing surfactant is added in solution in a concentration in the range of 0.001 to 5, preferably 0.001 to 2, weight percent, and more preferably 0.01 to 1 weight percent. The lignosulfonate dispersant is present in solution in a concentration in the range of from 0.1 to 10 weight percent. In addition to the advantage gained from the lignosulfonate dilution mechanism of precipitation, the lignosulfonate's cost is only about ½ of the cost of long chain nonionic dispersing surfactants.

It is often advantageous to make the aqueous slug with readily avialable oil field waters or produced brine. Since lignosulfonate dispersing agents alone do not stabilize brine suspension, the previously described nonionic dispersing surfactant is added to the aqueous slug. Or viewed another way, the adsorption mechanism of the conventional stable carrier-oil-displacing surfactant-dispersing surfactant slug is modified to include a dilution mechanism by the addition of lignosulfonate dispersing agents to the slug. In this embodiment, wherein a two-component dispersant is used, the surfactant carrier and oil-displacing surfactant are present in the same amounts as utilized in the single dispersant (lignosulfonate) slug. One conventional aqueous slug contains in solution from about 0.001 to 5, preferably 0.001 to 2, weight percent of the dispersing surfactant. At least ½ of this amount can be replaced by the lignosulfonate dispersing agent without sacrificing stability in a salt water slug. Thus, in a preferred embodiment the slug comprises from 0.5 to 2 weight percent surfactant carrier, from 0.001 to 2 weight percent oil-displacing surfactant, from 0.001 to 1 weight percent dispersing surfactant and from .001 to 1 weight percent lignosulfonate. As the two-component dispersant slug containing the surfactant carrier and oil-displacing surfactant is driven through the stratum, instability and precipitation are induced at the leading edge by the dilution of the lignosulfonate dispersant and the stratum's adsorption of the dispersing surfactant. At the trailing end of the slug precipitation of the surfactant carrier and oil-displacing surfactant results from dilution of the lignosulfonates and by adsorption of the dispersing surfactant if adsorption equilibrium has not been attained.

The amount of the aqueous slug injected into the stratum is usually in the range of about 0.1 to about 1 pore volume, but lesser or greater amounts of the suspension of minute solids may be utilized, depending upon the pore size and pore character of the oil stratum being produced.

The following examples will serve to further illustrate the invention.

EXAMPLE I

To approximate the composition of a produced oil field brine, 725.4 grams of NaCl, 190.3 grams of $CaCl_2$ and 85.7 grams of $MgCl_2 \cdot 6H_2O$ were dissolved in 18 liters water. Attempts were made to suspend 4 grams/liter of carbon black in the brine using 1.2 grams/liter, 2.4 grams/liter, 3.6 grams/liter, 4.8 grams/liter, 9.6 grams/liter, 14.4 grams/liter and 19.2 grams/liter of calcium lignosulfonate. The carbon black used was intermediate super abrasion furnace black. The calcium lignosulfonate contained 4.7 percent S, 3.5 percent CaO, 0.9 percent MgO, and 8.1 percent $Na_2O$. None of these mixtures gave stable suspensions in brine.

A mixture of 4 grams/liter carbon black and 2.4 gram/liter calcium lignosulfonate in fresh water resulted in a suspension which was still stable (no precipitation of carbon black) after 11 days at 120° F.

To evaluate stability of this fresh water suspension in the presence of a reservoir sand, 30-gram sand samples were mixed with 15 ml., 20 ml. and 30 ml. portions of the stable fresh water suspension. These samples correspond to 1.5, 2.0 and 3.0 pore volumes. In all samples the suspension remained stable.

To comparable samples of the sand and fresh water suspension, volumes of brine corresponding 5 percent, 10 percent, 25 percent and 50 percent of sample volume were added. The brine-containing samples were mixed and allowed to stand undisturbed. The observations as to the stability of the deficient suspension after 11 days are tabulated below:

TABLE I

| | Volume percent brine added | | | |
|---|---|---|---|---|
| | 5 | 10 | 25 | 50 |
| No sand | S | S | S | U |
| 1.5 Pore volume | S | S | S | U |
| 2.0 Pore volume | S | S | S | U |
| 3.0 Pore volume | S | S | S | U |

S=Stable.
U=Unstable, carbon black precipitated.

These data indicate that between 25 and 50 percent dilution with the brine, a 2.4 gram/liter concentration of calcium lignosulfonate in fresh water loses its effectiveness as a dispersing agent for carbon black in the presence of a reservoir sand. Thus, as the leading edge of an aqueous slug containing similar quantities of calcium lignosulfonate and carbon black become diluted so that the edge contains about ⅓–½ connate water, carbon black precipitation will result.

EXAMPLE II

A tube displacement test was run to demonstrate the oil-displacing properties of the lignosulfonate-carbon black suspension. A suspension containing 4 grams per liter of carbon black, 2.4 grams per liter calcium lignosulfonate and 2.4 grams per liter Igepal CO–530 in fresh water was prepared. The Igepal CO–530, a trade name of Antara Chemical Division of General Aniline and Film Company, is an oil-displacing surfactant, further identified as nonylphenoxy polyethanol having an average of 6 to 6.5 units of ethylene oxide in the hydrophilic chain. This fresh water suspension was injected into a 6-foot by ¾-inch inside diameter tube which was packed with reservoir sand which had been saturated with crude oil and previously water flooded with the brine. The injected suspension broke through at the producing end of the tube after 0.62 pore volume had been injected. An oil bank was recovered just preceding the suspension breakthrough. The suspension injection was continued until 0.93 pore volume had been injected and oil production had returned to the same level as after water flooding. Brine was then injected to drive the portion of the slug remaining in the tube on through. Production of excess additive continued until 1.91 pore volumes had been recovered. At this point there was the production of an additional oil bank at the trailing edge of the additive slug. The incremental oil produced by the injection of the aqueous slug of suspended solids and surfactant totaled 8.6 percent of the pore volume.

This example demonstrates that oil is displaced through the stratum by a suspension which is stabilized with the lignosulfonate dispersing agent. It further indicates that there is precipitation and contact of the oil-displacing surfactant with the sand at both the leading and trailing edges of the slug.

EXAMPLE III

Suspensions of carbon black and Igepal CO–990, a nonionic dispersing surfactant, in brine are known to be stable and in combination with Igepal CO–530 produce oil. Igepal CO–990, a trade name of Antara Chemical Division of General Aniline and Film Company, is identified as nonylphenoxy polyethanol having an average chain length on the hydrophilic end in the range of 95 to 100 mols or units of ethylene oxide. To demonstrate that at least half of the dispersing surfactant can be replaced with a lignosulfonate dispersing agent to form a stable aqueous slug, a brine suspension containing 1.2 grams per liter of calcium lignosulfonate, 1,2 grams per liter Igepal CO–990, 2.4 grams per liter Igepal CO–530 and 4 grams per liter carbon black was made. For purposes of comparison a brine suspension containing 2.4 grams per liter Igepal CO–990, 2.4 grams per liter Igepal CO–530, and 4 grams per liter carbon black was also made. Portions of each brine suspension were added to reservoir sand to obtain samples corresponding to 1.5, 2.0, and 3.0 pore volumes. These samples were mixed and allowed to stand undisturbed. The observations as to the stability after six days are tabulated below:

TABLE II

| | Suspension No. 1 | Suspension No. 2 |
|---|---|---|
| 1.5 Pore volume | U | U |
| 2.0 Pore volume | U | U |
| 3.0 Pore volume | S | S |

The data indicate that the two-component dispersant system provides a degree of suspension stability comparable to that provided by the nonionic dispersing surfactant alone. The lignosulfonate-long chain nonylphenoxy polyethanol system is subject to both the adsorption and dilution mechanisms of precipitating the carbon black and oil-displacing surfactant from suspension. The combination of these two dispersing agents allows the use of brine to form the aqueous slug and eliminates bypassing of recoverable oil in the stratum.

Reasonable modification and variations are within the scope of the invention which defines a novel aqueous fluid drive process for recovering oil.

That which is claimed is:

1. A method of producing oil from an oil stratum by aqueous fluid drive comprising the steps of:
   (1) injecting into said stratum through a well therein an aqueous slug comprising:
      (a) a suspension of minute solids in a size range capable of being driven through such stratum by aqueous fluid drive to assist in displacing oil therefrom;
      (b) a nonionic oil-displacing surfactant selected from the group consisting of polyethylene oxide ethers and thioethers having a maximum ethylene oxide chain length at the hydrophilic end in the range of 4 to 11 mols in solution in a concentration in the range of 0.001 to 2 weight percent of said slug;
      (c) a water soluble lignosulfonate dispersant in solution in a concentration in the range of about 0.1 to 10 weight percent of said slug;
   (2) thereafter injecting aqueous driving medium through said well so as to drive said suspension in surfactant solution through said stratum to displace oil from said stratum;
   (3) producing the displaced oil from a well bore penetrating said stratum.

2. The method of claim 1 wherein said minute solids have a size range of 0.001 to 1 micron and are selected from the group consisting of carbon black, kaolin and talc and are present in suspension in a concentration in the range of 0.05 to 2 weight percent of said slug.

3. The method of claim 1 wherein said nonionic oil-displacing surfactant comprises nonlyphenoxy polyethanol having an average chain length on the hydrophilic end in the range of 6 to 6.5 mols or units of ethylene oxide.

4. The method of claim 1 wherein said water soluble lignosulfonate is selected from the group consisting of calcium lignosulfonate, ammonium lignosulfonate, potassium lignosulfonate, sodium lignosulfonate, or ferrochrome lignosulfonate.

5. The method of claim 1 wherein said aqueous slug comprises brine and contains additionally a dispersing surfactant represented by the formula R—O—R'—H wherein R is an aliphatic alkyl of 5 to 20 carbon atoms or an alkylaryl, the alkyl having 8 to 20 carbon atoms, and R' is polyethylene oxide of an average of 30 to 100 mols or units of ethylene oxide in solution in a concentration in the range of 0.001 to 1 weight percent of said slug; and said water soluble lignosulfonate is present in solution in a concentration in the range of 0.001 to 1 weight percent of said slug.

6. The method of claim 1 wherein said nonionic oil-displacing surfactant has an ethylene oxide chain length at the hydrophilic end in the range of 4 to 6.5 mols or units of ethylene oxide.

7. The method of claim 1 wherein said nonionic oil-displacing surfactant having the formula R—R'—R"—H wherein R is an aliphatic alkyl of 9 to 20 carbon atoms or an alkylaryl in which the alkyl has from 8 to 20 carbon atoms and the aryl is attached to the R', said R' is oxygen or sulfur, and R" is a polyethylene oxide of an average of 4 to 11 ethylene oxide mols or units.

References Cited

UNITED STATES PATENTS

| Patent No. | Date | Inventor | Class |
|---|---|---|---|
| 2,721,840 | 10/1955 | Lee | 252—8.5 |
| 3,095,409 | 6/1963 | King et al. | 252—8.5 |
| 3,135,727 | 6/1964 | Monroe | 252—8.5 |
| 3,323,589 | 6/1967 | Harvey | 166—9 |
| 3,326,287 | 6/1967 | Corrin | 166—9 |
| 3,362,474 | 1/1968 | Purre | 166—9 |
| 3,384,171 | 5/1968 | Parker | 166—9 |
| 3,401,748 | 9/1968 | Stratton | 166—9 X |
| 3,407,877 | 10/1968 | Harvey et al. | 166—9 |
| 3,412,792 | 11/1968 | Parker et al. | 166—9 |

STEPHEN J. NOVOSAD, Primary Examiner

U.S. Cl. X.R.

166—275